United States Patent [19]

Trivedi

[11] Patent Number: 4,459,381
[45] Date of Patent: Jul. 10, 1984

[54] FLAME RETARDANT HIGH IMPACT P-METHYLSTYRENE COMPOSITIONS

[75] Inventor: Viren P. Trivedi, Old Bridge, N.J.

[73] Assignee: Mobil Oil Company, New York, N.Y.

[21] Appl. No.: 441,338

[22] Filed: Nov. 15, 1982

[51] Int. Cl.³ .................. C08K 5/52; C08K 5/53
[52] U.S. Cl. .................. 524/130; 524/141; 524/143; 524/144; 525/289; 525/316; 525/322
[58] Field of Search .......... 524/130, 144; 525/316, 525/322

[56] References Cited

U.S. PATENT DOCUMENTS

| | | | |
|---|---|---|---|
| 3,041,293 | 6/1962 | Polacek | 524/144 |
| 3,046,236 | 7/1962 | Jahn | 524/130 |
| 3,287,309 | 11/1966 | Basdekis et al. | 524/144 |
| 3,412,052 | 11/1968 | Taylor et al. | 524/130 |
| 3,639,506 | 7/1972 | Haaf | 524/141 |
| 4,010,225 | 3/1977 | Noetzel et al. | 524/130 |
| 4,077,934 | 3/1978 | Lee, Jr. | 524/144 |
| 4,166,812 | 9/1979 | Lee, Jr. | 524/130 |
| 4,284,733 | 8/1981 | Russo | 525/316 |
| 4,306,049 | 12/1981 | Prapas | 525/316 |

Primary Examiner—John Kight, III
Assistant Examiner—R. A. White
Attorney, Agent, or Firm—Alexander J. McKillop; Michael G. Gilman; Charles J. Speciale

[57] ABSTRACT

The present invention provides a non-foamed flame-retardant article of polymeric composition comprising at least 20% by weight of a monomer mixture comprising 0–0.1% by weight o-methylstyrene 0–15% by weight m-methylstyrene and at least 85% by weight p-methylstyrene; 0–80% by weight of a different ethylenic unsaturated monomer; and a sufficient amount of flame-retardants wherein the amount of flame-retardants is substantially less than would be needed had the p-methylstyrene been replaced with styrene analogs. The flame retardancy is achieved by the addition of organophosphorus or halogenated organophosphorus flame retardants. High impact resistance is achieved by the incorporation of a rubbery polymer into the polymeric composition.

19 Claims, No Drawings

FLAME RETARDANT HIGH IMPACT P-METHYLSTYRENE COMPOSITIONS

FIELD OF THE INVENTION

The present invention relates to p-methylstyrene resin compositions of reduced flammability and, more specifically, to such resin compositions having a high impact resistance.

BACKGROUND OF THE INVENTION

There has been an increased recent demand for styrene resins of reduced flammability. Various methods have been proposed to make styrene resins, including high-impact polystyrene, styrene-acrylonitrile-butadiene copolymers, styrene-methyl methacrylate-butadiene copolymers, and the like, less flammable. For example styrene resins having a reduced tendency to ignite and propagate flame in the absence of an external heat source have been prepared by adding an organic halide and an inorganic flame retardant, such as antimony trioxide. However, the use of such flame-retardants, especially materials such as antimony trioxide which must be introduced in particulate or crystaline form because they do not melt or fuse at temperatures at which styrene resins are usually worked, is likely to lower the toughness of the polymers markedly and to diminish or adversely affect desirable physical properties inherent in the resins. Even with the use of machines having a high mixing efficiency to work styrene resins, no appreciable improvement has been achieved. Also, flame-retarded styrene resins exhibit much diminished release properties during molding. This imposes a substantial limitation on the degree of freedom in designing, molding and productivity which are advantageous features of the styrene resins which do not contain flame retardants.

Organic halides are very effective in providing the polymers with a reduced tendency to ignite and burn in the absence of an external heat source, but have a tendency to make the polymers drip while they are burning, and, in order to achieve flame retarded compositions in the range of V-1 to V-0 provided under Subject 94 by Underwriter's Laboratories, Inc. (hereinafter referred to as UL-94), a large amount of halide must be added. The use of antimony compounds in combination with the halides is known to be effective in obviating such a defect. However, even with the addition of the antimony compounds, the polymers tend to drip as the thickness of polymer moldings becomes smaller, and it is very difficult to bring the polymers to conform to the range of V-1 to V-0 under UL 94. A solution to this problem has long been desired and is available in accordance with this invention by substituting p-methylstyrene polymers for styrene polymers.

The tests employed herein to demonstrate suppressed ignition properties and burning accurately demonstrate the ignition or burning characteristics of the polymers when exposed to small scale ignition sources according to the standards specified. It is well recognized by those skilled in the art and it should be clearly understood that all known organic polymers will burn when subjected to a sufficiently intense heat source whether or not they contain a fire-retardant additive. "To drip" or "dripping" referred to hereinafter, according to the vertical burning tests under UL-94, means to drip particles from a specimen during the application of a test flame or after the removal of the flame. Failure to achieve a V-1 or V-0 rating results when the dripping particles ignite a piece of cotton held under the specimen, regardless of whether or not the particles were flaming.

As can be seen from the above, a flame-retardant resin composition using substantially lower amounts of flame-retardant would be advantageous considering not only the physical properties of the end product but also cost effectiveness.

SUMMARY OF THE INVENTION

The present invention provides a non-foamed flame-retardant article of polymeric composition comprising at least 20% by weight of a monomer mixture comprising 0-0.1% by weight o-methylstyrene, 0-15% by weight m-methylstyrene and at least 85% by weight p-methylstyrene; 0-80% by weight of a different ethylenic unsaturated monomer; and a sufficient amount of flame-retardants wherein the amount of flame-retardants is substantially less than would be needed had the p-methylstyrene been replaced with styrene analogs. The flame retardancy may be achieved by the addition of organophosphorous and halogenated organophosphorous flame retardants. High impact resistance is achieved by the incorporation of a rubbery polymer into the polymeric composition.

DESCRIPTION OF THE SPECIFIC EMBODIMENTS

The flame-retarded polymethylstyrene resins of the present invention can be prepared from the mixture of methylstyrene isomers alone, described below, or the resins can be random, block or graft copolymers derived from 20 weight percent (wt.%) or more of the defined methylstyrene isomers and up to 80 weight percent of other ethylenically unsaturated monomers.

The polymethylstyrene resins useful in the present invention comprised entirely of polymerized methylstyrene can be obtained by polymerizing a mixture of isomers in the following ratio:

| ISOMER | WEIGHT PERCENT |
|---|---|
| ortho-methylstyrene | less than 0.1, preferably less than 0.05. |
| meta-methylstyrene | less than 15, preferably less than 10. |
| para-methylstyrene | 85-100, preferably at least 90 |

Generally, the proportion of the para-methylstyrene isomer will be at least 95 weight percent and the meta-methylstyrene isomer will constitute less than 5 weight percent of the mixture. Particularly preferred mixtures contain 97 to 99 weight percent of the p-isomer and 1 to 3 weight percent of the m-isomer.

The mixture of the isomeric methylstyrenes for the preparation of the polymethylstyrene resins can be obtained by the catalytic dehydrogenation of a mixture of the corresponding ethyltoluenes, which in turn can be obtained by the selective alkylation process disclosed in U.S. Pat. No. 4,143,084 of Warren W. Kaeding and Lewis B. Young, the disclosure of which is incorporated herein by reference.

In its application to the production of methylstyrenes, the method disclosed in the Kaeding and Young patent essentially involves the alkylation of toluene with ethylene in the presence of certain crystalline alumino-silicate zeolite catalysts. The catalyst has a silica to alumina ratio of at least 12 and a constraint index (defined in the patent) within the range of 1 to 12. The process produces an extremely high proportion of the para-methylstyrene isomer, with only a minor proportion of the meta-methylstyrene isomer and negligible amounts of the ortho-methylstyrene isomer. During the dehydrogenation step, the almost complete absence of the ortho-isomer is highly advantageous because this isomer tends to produce undesired by-products such as indanes and indenes which adversely affect the properties of the resultant polymers and which cannot be easily separated from the methylstyrenes.

The mixture of isomeric methylstyrenes can be subjected to distillation prior to dehydrogenation step in order to separate out various by-products and after the dehydrogenation has been completed, a further distillation can be carried out to separate the methylstyrenes from their saturated precursors.

Since the proportion of the para-methylstyrene in the mixture is so high, usually at least 95 by weight, the mixture can be regarded essentially as "the para monomer" and the polymer produced by the polymerization of this mixture in the absence of other monomers as "the homopolymer" in order to distinguish it from polymers produced by polymerizing the mixture with other, copolymerizable monomers. It should, however, be remembered that "the homopolymer" may, in fact, be a copolymer of the isomeric monomers.

In general, the polymerization conditions appropriate to styrene will also be useful with the methylstyrene. Thus, polymerization can be effected under bulk conditions or in solution, suspension or emulsion techniques comparable to those used for styrene polymerization. The polymerization catalysts may be of the free radical, anionic or cationic types. Suitable free radical initiators include ditertiary butyl peroxide, azobis (iso-butyronitrile), di-benzoyl peroxide, tertiary butyl perbenzoate, dicumyl peroxide and potassium persulfate. Cationic initiators are generally of the Lewis acid type, for example, aluminum trichloride, boron trifluoride, boron trifluoride etherate complexes, titanium tetrachloride and the like. Anionic initiators are generally of the formula $RM_y$ where R is organo, mono- or polyvalent and may be alkyl, alkenyl, aryl, aralkyl, and alkaryl, and can contain from 1 to about 50 carbon atoms; and y is 1 to 4, and preferably 1 to 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type may be used. Branched chain polymers may be obtained by using multifunctional initiators, for example, 1,3,5-trilithiocyclohexane and 1,4,7,10-tetrapotassiodecane. In the anionic polymerization each molecule of the initiator starts one anionic polymer chain; multiple anions can permit addition of secondary chains to the main chain. Stereospecific catalysts can also be used to advantage. Such catalysts are generally of the well known Ziegler type, comprising a transition metal of Group 4A, 5A, 6A or 7, having a valance state lower than its maximum in combination with an organometallic compound of Group 2 or 3.

Among the reducible transition metal compounds suitable for the purpose of this invention are the heavy metal, inorganic compounds such as halides, oxyhalides, complex halides, hydroxides, and organic compounds such as alcoholates, acetates, benzoates, and acetyl acetonates, or the requisite metals. Such metals include titanium, zirconium, hafnium, thorium, uranium, vanadiaum, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zirconium acetylacetonate.

The reduction can be effected in any suitable manner, for example, by reduction with hydrogen or aluminum. Titanium tetrachloride can be readily reduced to titanium trichloride by reduction with hydrogen, aluminum or titanium metal. Suitable reduction methods are well known in the art and are described, for example, in U.S. Pat. No. 3,362,940 which is incorporated herein by reference.

The other component of the catalyst system is at least one organometallic compound of a metal of Groups 2 or 3. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radical, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromoaluminum hydride, dipropylaluminum hydride, propyl zinc hydride, ethylmagnesium hydride, and methoxyaluminum diethyl. Mixtures of two or more oganometallic compounds can be used.

The catalyst can be formed by methods well known in the art. Thus, for example, it can be made by charging the components separately to the polymerization zone or they can be combined immediately prior to entry into the zone.

As previously mentioned, the polymerization may be carried out in bulk, in solution, in suspension or in emulsion. Solution polymerization will generally employ inert hydrocarbon solvents such as toluene, benzene or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

Polymerization can also be carried out thermally.

The polymerization conditions will generally be similar to those used for styrene. Thus temperatures will generally be in the range of 0° to 200° C., preferably 50° to 150° C., with a range of about −80° C. to +30° C. being most appropriate for cationic polymerization.

The methylstyrene polymers are notable for a higher Vicat softening temperature than polystyrene. Vicat softening temperature is measured by ASTM method D-1525. It, also, has been found to vary with the content of p-isomer in the monomer mixture, as shown below in Table 1.

TABLE 1

| Content of para-methylstyrene wt. percent | Vicat °C. ± 1° C. |
| --- | --- |
| 99.7 | 118 |
| 97.0 | 119 |
| 95.5 | 114 |
| 89.3 | 108 |

By comparison, polystyrene has a Vicat of about 107° to 108° C. and the polymer of "vinyl toluene" a Vicat of only 97° C. Thus, the homopolymers prepared from the above described mixture are characterized by a Vicat temperature of at least 100° C., generally at least 110° C. or 112° C.

The polymers will generally have a molecular weight corresponding to intrinsic viscosities of 0.1 to 10 (toluene/30° C.). This will generally correspond to molecular weights of at least 30,000, with most molecular weights (Mv—viscosity average) being about 250,000 to 275,000 for commercial materials. The glass transition temperatures for very low molecular weight materials (below 50,000) may be lower than those indicated and therefore not suited for uses where solid state properties are desired. The melt indices will normally be in the range of 1.0 to 20.0, generally 3.0 to 8.0. Relative densities of the polymers are about 2–4% lower than those of styrene, being just above 1.0, generally about 1.01. Good optical properties as indicated by transmittances of at least 88% are typical of the polymers.

Another class of poly (methylstyrene) resins particularly desirable for use in the present invention are the high impact copolymers produced by grafting units derived from the above described polymerizable mixture onto a backbone polymer which is generally of a rubbery nature. Suitable backbone polymers include polybutadiene, poly(dimethyl butadiene), polyisoprene, polychloroprene and other synthetic rubbers such as the styrene-butadiene rubbers (SBR), ethylene-propylene rubbers (EPR), ethylene-propylene-diene elastomers, polyacrylates, nitrile rubbers and copolymers with other aromatic monomers including vinyl toluene. The grafted polymer will generally comprise 2 to 25 percent by weight of the high impact p-methylstyrene copolymer, preferably 3 to 15% by weight, most preferably 5 to 10 percent by weight. Normal techniques, e.g., grafting, comparable to those used for making high impact polystyrenes are useful; they are well known in the art and referred to, for example, in U.S. Pat. No. 2,694,692 which is incorporated herein by reference, and in British Pat. No. 1,054,301.

Random copolymers formed with methylstyrene isomers and butadiene can also be used in the invention. They can be produced by methods similar to those used in the manufacture of GR-S synthetic rubber and described, for example, in "Synthetic Rubber", Ed. Whitby et al, John Wiley, New York, 1954. A suitable polymerization mixture is shown in Table 2 below:

TABLE 2

BUTADIENE - PMS POLYMERIZATION FORMULA

| | Parts per 100 parts Total Monomers |
| --- | --- |
| Butadiene | 70.00 |
| Methylstyrene mixture | 30.00 |
| Dodecyl mercaptan | 0.50 |
| Potassium persulfate | 0.23 |
| Soap (anhydrous basis) | 4.30 |
| Water | 180.00 |
| | 285.03 |

Generally, a slightly greater proportion by weight will be required for the methylstyrene mixture, as compared to styrene, because of its higher molecular weight. However, the polymerization conditions used for styrene will be generally applicable with the new monomer mixture.

Block copolymers comprising at least 50 weight percent of the mixture of methylstyrene monomers described above can be prepared by methods well known in the art and can be used as a component of the composition of this invention.

The reduced flammability of the resins of the present invention is obtained by utilizing organophosphorus and halogenated organophosphorus flame-retardants. The organophosphorus and halogenated organophosphorus flame-retardants used may be any of well-known aromatic, aliphatic or cycloaliphatic compounds examples of which are Bis(2-chloroethyl)-2-chloroethylphosphonate (Mobil's Antiblaze-78), adducts of dimethyl methyl phosphonate and trimethylolpropane phosphite (e.g. Mobil's Antiblaze-19), triphenyl phosphate (Monsanto's TPP), Bis(beta-chloroethyl)vinylphosphonate (Stauffer's Fyrol Bis Beta), tri($\beta,\beta'$-dichloroisopropyl)-phosphate (Stauffer's Fyrol FR-2), isopropyl phenyl diphenyl phosphate (FMC's Kronitex-50) and the like. The above merely represent examples and are not intended to be limiting on the present invention. U.S. Pat. No. 3,789,091 to Anderson et al, which is hereby incorporated by reference in its entirety, discloses methods for making such organophosphorus flame-retardants.

In mixing the aforementioned components, an intended kneaded mixture may be obtained by first mixing the component materials by an ordinary mixing machine such as a mixer, drum blender or kneader and, then, kneading the mixture through an extruder or melt-kneading the same through a heating roll, Banbury mixer or other suitable means. In this case, a coloring agent, plasticizer, stabilizer, ultraviolet absorber, foaming agent, inorganic reinforcing agent and/or other additives which do not adversely affect the resin composition according to the present invention may be added in a suitable amount as required.

Hereinafter, the present invention will be described further in detail by way of the preferred embodiments and comparative examples.

Several compositions of flame retardant (FR) crystal and impact poly(paramethylstyrene), poly(PMS), were made in a 40 ml. laboratory Brabender at about 170° F. The flame retarding additives, Mobil's Antiblaze-19 and Antiblaze-78, and Stauffer's Fyrol FR-2 were mixed with the base resin to produce various flame-retarded compositions as shown in Tables 3 and 5. Comparative examples of flame-retarded impact polystyrene compositions were also prepared as shown in Tables 4 and 6.

Additionally, Table 7 shows some flame retarding impact poly (PMS) compositions utilizing Stauffer's Fyrol Bis Beta, FMC's Kronitex-50 and Monsanto's TPP as the flame retarding additives. UL-94 vertical flammability tests were run on 1/8 inch and 1/16 inch compression molded samples. The results are shown in the Tables.

TABLE 3

| COMPOSITIONS (Phr) | A | B | C | D | E | F |
|---|---|---|---|---|---|---|
| FLAME RETARDANT COMPOSITIONS | | | | | | |
| Impact Poly (PMS) | 100 | 100 | 100 | 100 | 100 | 100 |
| Antiblaze-19 | 5 (1.07) | 10 (2.15) | — | — | — | — |
| Antiblaze-78 | — | — | 5.83 (0.70) | 8.17 (0.98) | — | — |
| Fyrol-FR-2 | — | — | — | — | 10 (0.71) | 14 (0.99) |
| UL-94 FLAMMABILITY | | | | | | |
| 1/8" | V-2 | V-2 | V-2 | V-2 | V-2 | V-2 |
| 1/16" | V-2 | V-2 | V-2 | V-2 | V-2 | V-2 |

( ) - Phosphorus - phr.

TABLE 4

| COMPOSITIONS (Phr) | A | B | C | D | E | F |
|---|---|---|---|---|---|---|
| FLAME RETARDANT COMPOSITIONS | | | | | | |
| Impact Polystyrene | 100 | 100 | 100 | 100 | 100 | 100 |
| Antiblaze-19 | 5 (1.07) | 10 (2.15) | — | — | — | — |
| Antiblaze-78 | — | — | 5.83 (0.70) | 8.17 (0.98) | — | — |
| Fyrol-FR-2 | — | — | — | — | 10 (0.71) | 14 (0.99) |
| UL-94 FLAMMABILITY | | | | | | |
| 1/8" | B | V-2 | B | B | B | V-2 |
| 1/16" | B | V-2 | B | B | B | V-2 |

B = BURNS
( ) - Phosphorus - phr.

TABLE 5

| COMPOSITIONS (Phr) | A | B | C | D | E | F |
|---|---|---|---|---|---|---|
| FLAME RETARDANT COMPOSITIONS | | | | | | |
| Crystal Poly (PMS) | 100 | 100 | 100 | 100 | 100 | 100 |
| Fyrol-FR-2 | 5 (0.35) | 14 (0.99) | — | — | — | — |
| Antiblaze-19 | — | — | 1.7 (0.35) | 4.71 (0.99) | — | — |
| Antiblaze-78 | — | — | — | — | 2.9 (0.35) | 8.17 (0.99) |
| UL-94 FLAMMABILITY | | | | | | |
| 1/8" | V-2 | V-2 | V-2 | V-2 | V-2 | V-2 |
| 1/16" | V-2 | V-2 | V-2 | V-2 | V-2 | V-2 |

( ) - Phosphorus - phr.

TABLE 6

| COMPOSITIONS (Phr) | A | B | C | D | E | F |
|---|---|---|---|---|---|---|
| FLAME RETARDANT COMPOSITIONS | | | | | | |
| Crystal Polystyrene | 100 | 100 | 100 | 100 | 100 | 100 |
| Fyrol-FR-2 | 5 (0.35) | 14 (0.99) | — | — | — | — |
| Antiblaze-19 | — | — | 1.7 (0.35) | 4.71 (0.99) | — | — |
| Antiblaze-78 | — | — | — | — | 2.9 (0.35) | 8.17 (0.99) |
| UL-94 FLAMMABILITY | | | | | | |
| 1/8" | V-2 | V-2 | B | V-2 | B | V-2 |
| 1/16" | B | V-2 | B | B | B | V-2 |

B = BURNS
( ) - Phosphorus - phr.

TABLE 7

| COMPOSITIONS (Phr) | A | B | C | D | E |
|---|---|---|---|---|---|
| FLAME RETARDANT COMPOSITIONS | | | | | |
| Impact Poly (PMS) | 100 | 100 | 100 | 100 | 100 |
| Fyrol Bis-beta | 10 | 14 | — | — | — |
| Tri-phenyl Phosphate | (1.33) | (1.86) | 10.31 (0.98) | — | — |

TABLE 7-continued

FLAME RETARDANT COMPOSITIONS

| COMPOSITIONS (Phr) | A | B | C | D | E |
|---|---|---|---|---|---|
| Kronitex-50 | — | — | — | 10 (0.81) | 14 (1.13) |
| UL-94 FLAMMABILITY | | | | | |
| 1/8" | V-2 | V-2 | V-2 | V-2 | V-2 |
| 1/16" | V-2 | V-2 | V-2 | V-2 | V-2 |

( ) - Phosphorus - phr.

The comparative results show that poly(PMS) flame retarded resins required flame retardant additive levels at least 40% less than that required by the polystyrene resins to obtain a V-2 rating under UL-94 flammability test conditions. As stated previously, this substantial reduction in the amount of flame retardants is highly advantageous. This reduction in the amounts of flame retardants translates to not only a reduction in the cost of production but also to a reduction in the adverse effects on physical properties such flame retardants cause.

As can be seen from the results reported in the above Tables, the high impact poly(PMS) compositions with Antiblaze-19 at 5 p.h.r., with Antiblaze-78 at 5.83 p.h.r., and with Fyrol FR-2 at 10 p.h.r. met the V-2 requirement of UL-94 test in 1/16 inch thickness. Comparatively, the impact polystyrene compositions required much higher levels of flame-retardant additives to meet the same flammability rating.

The test results also showed that crystal poly(PMS) formulations achieved V-2 rating with Antiblaze-19 at 1.7 p.h.r., with Antiblaze-78 at 2.9 p.h.r, and with Fyrol FR-2 at 5 p.h.r. while analogous crystal polystyrene compositions required a significantly higher level of additives.

As can be seen from the presented data, it is evident that a poly(PMS) article, utilizing organophosphorus and halogenated organophosphorus compounds as flame-retardants, would be less costly and may exhibit improved physical properties compared not only to polystyrene articles which are flame retarded to the same degree but also to poly(PMS) articles utilizing other flame-retardants. The savings in costs alone would be substantial.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What I claimed is:

1. A non-foamed, flame-retarded article comprising:
   a. methylstyrene resin containing at least 20% by weight of polymerized units derived from a mixture of methylstyrene isomers consisting essentially of 0–0.1 percent by weight ortho-methylstyrene, 0–15 percent by weight meta-methylstyrene, and at least 85 percent by weight para-methylstyrene, and 0 to 80 percent by weight of a different ethylenically unsaturated monomer; and
   b. a sufficient amount of organophosphorus flame-retardant to achieve at least a V-2 flame-retardancy under UL-94 test wherein said sufficient amount of flame-retardants is substantially less than that required for polystyrene analogs to achieve the same V-2 flame-retardancy.

2. The article of claim 1 wherein a sufficient amount of organophosphorus flame-retardants is added to achieve a V-0 flame-retardancy under UL-94 flammability test.

3. The article of claim 1 wherein the mixture of isomers of methylstrene consists essentially of at least 90% by weight para-methylstyrene, 0–10% by weight meta-methylstyrene, and 0–0.1% by weight ortho-methylstyrene.

4. The article of claim 1 wherein the mixture of isomers of methylstyrene consists essentially of at least 95% by weight para-methylstyrene, 0–5% by weight meta-methylstyrene, and 0–0.05% by weight ortho-methylstyrene.

5. The article of claim 1 wherein said sufficient amount of flame-retardant is at least 40% less than that required for polystyrene analogs to achieve the same V-2 flame-retardancy.

6. The article of claim 2 wherein said sufficient amount of flame-retardant is at least 25% less than that required for polystyrene analogs to achieve the same V-0 flame-retardancy.

7. The article of claim 1 wherein the flame-retardancy is achieved by the addition of a sufficient amount of a halogenated organophosphorus flame-retardant.

8. The article of claim 1 wherein the flame-retardancy is achieved by the addition of a flame-retardant selected from the group consisting of Bis(2-chloroethyl)-2-chloroethylphosphonate, adducts of dimethyl methyl phosphonate and trimethylolpropane phosphite, Bis(beta chloroethyl) vinylphosphonate, tri($\beta,\beta'$-dichloroisopropyl)phosphate, isopropyl phenyl diphenyl phosphate, and triphenyl phosphate.

9. The article of claim 8 wherein a rating of V-2 under UL-94 flammability test is achieved by adding less than 15% by weight total flame-retardant.

10. A non-foamed, high impact, flame-retarded article comprising:
    (a) a high impact graft copolymer produced by grafting a methylstyrene resin onto a backbone polymer chain which is of a rubbery nature wherein the methylstyrene resin contains at least 20% by weight of polymerized units derived from a mixture of methylstyrene isomers consisting essentially of 0–0.1 percent by weight ortho-methylstyrene, 0–15 percent by weight meta-methylstyrene, and at least 85 percent by weight para-methylstyrene, and 0 to 80 percent by weight of a different ethylenically unsaturated monomer; and
    (b) a sufficient amount of organophosphorus flame-retardant to achieve at least a V-2 flame-retardancy under UL-94 test wherein said sufficient amount of flame-retardants is substantially less than that required for polystyrene analogs to achieve the same V-2 flame-retardancy.

11. The article of claim 10 wherein a sufficient amount of organophosphorus flame-retardants is added to achieve a V-0 flame-retardancy under UL-94 flammability test.

12. The article of claim 10 wherein the mixture of isomers of methylstyrene consists essentially of at least 90% by weight para-methylstyrene, 0–10% by weight meta-methylstyrene, and 0–0.1% by weight ortho-methylstyrene.

13. The article of claim 10 wherein the mixture of isomers of methylstyrene consists essentially of at least 95% by weight para-methylstyrene, 0-5% by weight meta-methylstyrene, and 0-0.05% by weight ortho-methylstyrene.

14. The article of claim 10 wherein the backbone polymer chain is selected from the group consisting of polybutadiene, a styrene-butadiene rubber, an ethylene-propylene rubber, and an ethylene-propylene-diene elastomer.

15. The article of claim 10 wherein said sufficient amount of flame-retardant is at least 40% less than that required for polystyrene analogs to achieved the same V-2 flame-retardancy.

16. The article of claim 11 wherein said sufficient amount of flame-retardant is at least 25% less than that required for polystyrene analogs to achieve the same V-0 flame-retardancy.

17. The article of claim 10 wherein the flame-retardancy is achieved by the addition of a sufficient amount of a halogenated organophosphorus flame-retardant.

18. The article of claim 10 wherein the flame-retardancy is achieved by the addition of a flame-retardant selected from the group consisting of Bis(2-chloroethyl)-2-chloroethylphosphonate, adducts of dimethyl methyl phosphonate and trimethylolpropane phosphite, Bis(beta chloroethyl) vinylphosphonate, tri($\beta,\beta'$-dichloroisopropyl)phosphate, isopropyl phenyl diphenyl phosphate, and triphenyl phosphate.

19. The article of claim 18 wherein a rating of V-2 under UL-94 flammability test is achieved by adding less than 15% by weight total flame-retardant.

* * * * *